July 27, 1965
M. L. DANNIS
3,196,671
APPARATUS FOR TENSILE TESTING MATERIALS AT
RAPID RATES OF LOAD APPLICATION
Filed Nov. 1, 1962
2 Sheets-Sheet 1
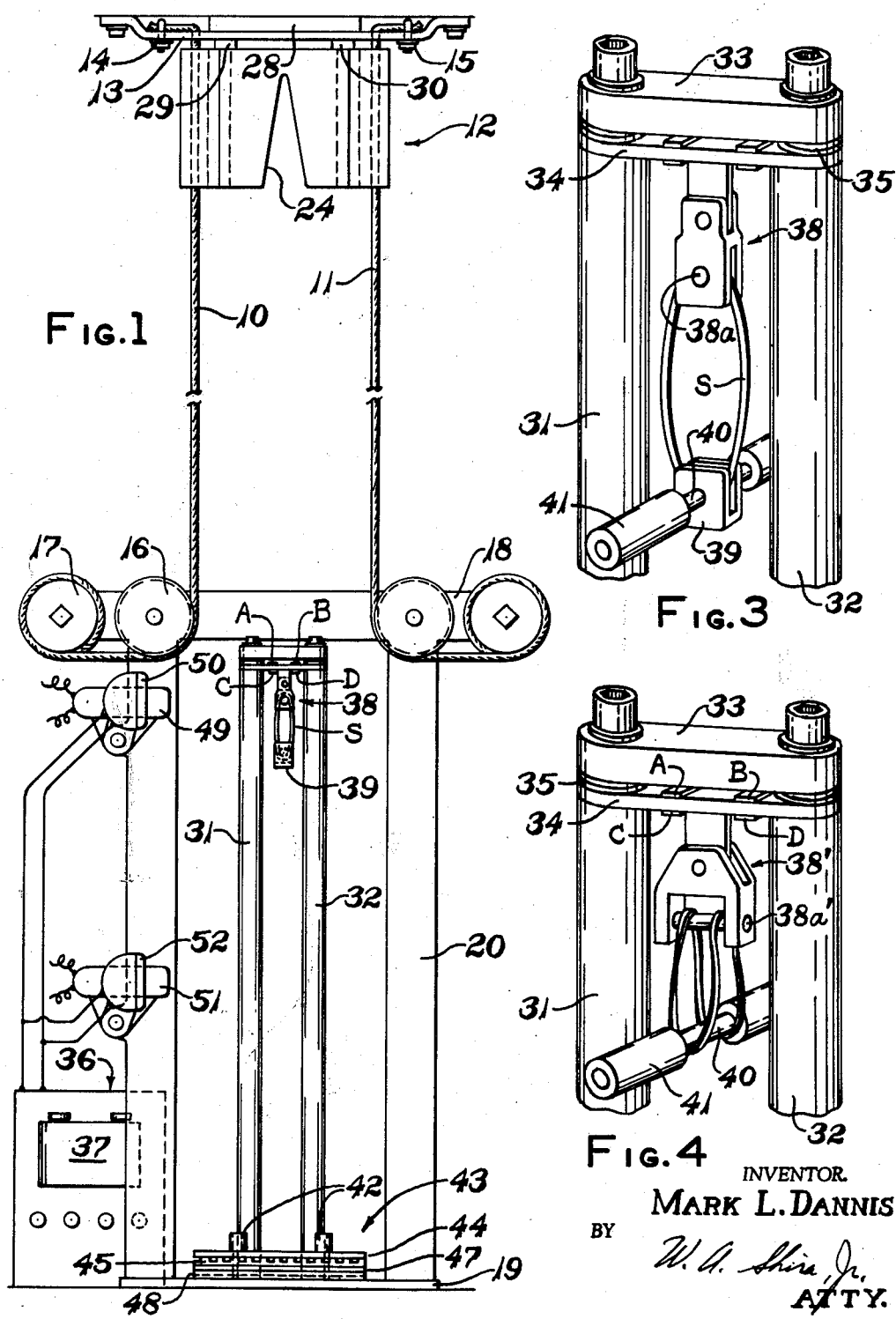
INVENTOR.
MARK L. DANNIS
BY
W. A. Shira Jr.
ATTY.

July 27, 1965              M. L. DANNIS            3,196,671
APPARATUS FOR TENSILE TESTING MATERIALS AT
RAPID RATES OF LOAD APPLICATION
Filed Nov. 1, 1962                                     2 Sheets-Sheet 2
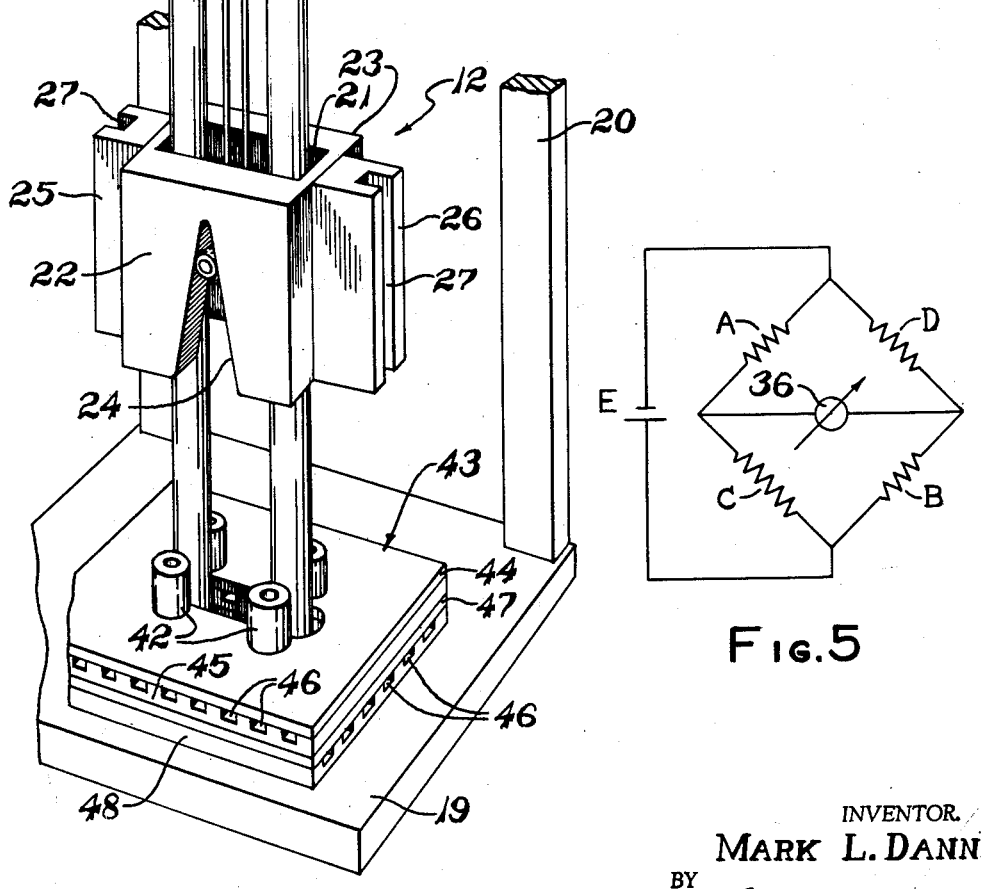
INVENTOR.
MARK L. DANNIS
BY
ATTY.

United States Patent Office 3,196,671
Patented July 27, 1965

3,196,671
APPARATUS FOR TENSILE TESTING MATERIALS
AT RAPID RATES OF LOAD APPLICATION
Mark L. Dannis, Maple Heights, Ohio, assignor to The
B. F. Goodrich Company, New York, N.Y., a corporation of New York
Filed Nov. 1, 1962, Ser. No. 234,644
6 Claims. (Cl. 73—95)

This invention relates to a testing apparatus and, more particularly, to an apparatus for providing an indication of the response to a rapidly applied load of a specimen capable of elongating.

It is now known that the properties of many materials, especially rubbery materials, depend upon the speed or rate at which they are subjected to stress. Thus, the dynamic properties of rubber change with the time scale of the stress application and, where the stress is applied during a very short time or at a very fast rate, the properties of rubber approach those of plastics having high modulus and low elongation. One area in which high rates of elongation of rubber is of particular importance is in the treads of vehicle tires, the characteristics of which cannot be adequately determined upon conventional testing machines where the load is applied at relatively low speeds, as for example in the order of 20 inches per minute. Even the higher speeds of testing, available on some of the more modern machines commercially available, provide loading rates capable of stretching the specimen at speeds of only 100 inches per second which is far below that calculated as being the rate to which tire treads are subjected in use.

Measurements and calculations show that, when a vehicle tire of the 7.50 x 14 size is operated at a speed of 60 miles per hour, the portion of the tire in contact with the road is only about 6½ inches in length with the loading and unloading of this portion of the tread taking place in approximately 6 milliseconds. Moreover, it has been determined that the loading and unloading of the tread portion in contact with the road are not equal but that the time for unloading is only about one-third of the contact time or about 2 milliseconds. It has been estimated that individual portions of the tread, during movement to and from contact with the road surface, may move about 0.01 inch relative to asperities of the road causing tendrils of rubber, in the same order of dimension, namely, 0.01 inch, to be pulled from the tread. It has further been computed that the average rate of stretching of these tendrils is in the range of 0.01 inch in the 2 millisecond of unloading thereby resulting in a nominal stretch rate of approximately 50,000% per second. This figure may be four or five times higher for individual portions of the tendrils near the base thereof. Therefore, in order to approximate elongations at this rate in the laboratory, it is necessary that a specimen having a nominal length of 1 inch be subjected to a testing condition such that it is extended at the rate of about 500 inches per second. This has not been possible with testing apparatus heretofore available.

In accordance with this invention, a testing apparatus for specimens capable of elongation is provided in which high rates of elongation are achieved by subjecting the specimen to the energy of a freely falling weight and indicating the response of the specimen to elongation produced by such energy through connection of the specimen to a force responsive device. More specifically, the apparatus provides a means for tensile testing of rubber and other elongatable materials at rapid rates of load application by supporting the specimen between a stationary support and a member engageable by a falling weight which is dropped from an elevation of sufficient height so that the specimen is broken without appreciable alteration in velocity of the falling weight, the response of the specimen to this action being indicated by a force responsive means connected to the stationary support for the specimen.

The nature of these and other features of this invention will be apparent from the following description of the presently preferred embodiment thereof described with reference to the accompanying drawings, forming a part of this application, and in which:

FIG. 1 is a front elevational view of the apparatus with certain parts shown schematically and others omitted for clarity of illustration;

FIG. 2 is a detached isometric view of the lower portion of the apparatus showing the specimen supporting means provided with a specimen which is elongated by the falling weight just prior to breakage of the specimen;

FIG. 3 is an enlarged fragmentary view of the specimen supporting portion of the apparatus showing the construction for supporting a ring-shaped specimen to provide two "legs" thereof for test;

FIG. 4 is a view similar to FIG. 3 but showing a modified specimen support to permit a ring-shape specimen to have four "legs" thereof subjected to test;

FIG. 5 is a schematic wiring diagram of the connections of the strain gauges to the indicating means of the apparatus; and FIG. 6 is a reproduction of a test record made by the apparatus during testing of a specimen therein.

The test apparatus comprises a pair of spaced, vertically extending parallel, guiding members 10 and 11 between which a weight member 12 is guided for free fall under the influence of gravity when the weight is released. In order to provide sufficient velocity for testing at loading rates productive of elongation in rubber specimens in the order of 500 inches per second, the apparatus must be so constructed that the weight member can have a distance of free fall in the order of 30 feet. Hence, the guide members 10 and 11 are preferably strong steel cables supported at the top and bottom thereof and tensioned between the supports to thereby provide straight guides without projections which would interfere with free fall of the weight member 12 therebetween. As here shown, the upper ends of the cables 10 and 11 are suitably anchored to a stationary support, as for example a plate member 13 through the use of fasteners 14 and 15 of appropriate type. The lower portions of the cables each extend around a direction changing pulley 16 with the end of each cable secured to and wrapped around a take-up drum 17 which serves to tension the cable and secure it under the selected tension. In the embodiment here shown, the pulleys 16 and 17 are carried by a plate member 18 which is supported upon a base 19 by vertical posts 20.

The weight member 12, as shown more clearly in FIG. 2, comprises a metal block, which may be formed of one piece or of a plurality of plates secured together, in a configuration which provides a vertically extending rectangular opening 21 therethrough. The front and back sides 22 and 23 of this weight member are each provided with a notch 24, extending from the exterior of the member to the rectangular opening 21 therein, which notches are each in the form of an inverted V. The lateral sides of the weight member are each provided with a vertically extending block 25, 26, respectively, formed of a material which has high abrasion resistance and a low coefficient of friction on steel. These are secured to the weight member by bolts or other suitable fastening means, not shown, and each has a vertically extending groove 27 which receives, respectively, the cable members 10 and 11. The dimensions of the parts are such that the weight member may move vertically between the guide members 10 and 11 without touching the latter, but in the event of contact, is guided thereby and restrained to vertical movement therebetween.

The weight member 12 is releasably held at a preselected elevation between the guide members 10 and 11 by a suitable release mechanism 28 which may comprise an electromagnet with non-magnetic locating lugs 29 and 30 for engagement by the weight. This electromagnet is controlled by a power supply and suitable switch, not shown, such that the weight member 12 is held against the lugs 29 and 30 when the electromagnet is energized and the weight is immediately released and drops freely between the guide members 10 and 11 when the electromagnet is deenergized.

The specimen supporting means is located beneath and adjacent to the lower ends of the members 10 and 11. In the form of the apparatus shown, this includes a pair of vertically extending posts 31 and 32 secured to the base 19 with their upper ends connected by a horizontally extending bracing member 33. Between the upper ends of the posts 31 and 32 and the bracing member 33 is a horizontally extending metal plate 34 which is spaced from the bracing member 33 by washers or other spacers 35. The plate 34 is the support for the force responsive means of the indicating mechanism and hence while rigid, this plate is, nevertheless, capable of limited bending under load. The bending of plate 34 under stress is sensed by a plurality of electrically energized strain gauges A, B, C and D secured to the plate and connected in a suitable indicating circuit. As shown in FIG. 5, the strain gauges A, B, C and D are connected in an electrical bridge circuit provided with a suitable source of electrical energy E and with the output of the bridge connected to an indicating means 36.

The preferred form of indicating means 36 comprises a cathode ray oscilloscope to which the strain gauges are connected by carrying the wires therefrom through a vertically extending opening in one of the posts 31, 32 and through or beneath the base plate 19 to thereby avoid interference with the free fall of the member 12. The oscilloscope 36 is preferably provided with an attachment for a camera 37 so that a picture may be taken of the indication provided on the screen of the oscilloscope.

The plate 34 has a specimen support 38 depending therefrom to which a portion of the specimen S, which is to be tested, is attached. In the form of the apparatus illustrated in FIGS. 1, 2 and 3, the specimen to be tested has a ring-shape and is suspended so that two legs thereof may be subjected to test. This is effected by forming the specimen support 38 with a bifurcated lower end within which the specimen S is received and suspended from a transversely extending removable pin 38a which is preferably cylindrical.

The specimen supporting means, including the posts 31 and 32, the brace 33, the strain gauge support 34 and the specimen support 38 connected thereto, are so dimensioned and positioned as to be freely received within the central opening 21 of the weight member 12 when the latter moves downwardly and leaves the guide members 10 and 11. During this movement, the weight member 12 engages projections extending into its path and suspended by the specimen S so that the energy of the falling weight member 12 is directly imparted to the specimen. For this purpose, the weight engaging member is here shown as comprising a generally U-shape block 39 provided with a transversely extending cylindrical opening through which a cylindrical rod 40 is inserted and which may be removed for reception of the specimen S between the rod and the bight of the block 39. The rod 40 is so suspended that its extends generally horizontally and at right angles to the plane of the guide members 10 and 11 with the length of the rod 40 sufficient to be engaged by both the forward and reverse sides of the weight member within the notches 24 thereof as indicated in FIG. 2. Preferably, the rod 40 has either end thereof provided with sleeves 41 of lead or other material of comparable nature to reduce injury to the apparatus by the impact.

The apparatus is so designed that the specimen is broken by the action of the falling weight without materially reducing the velocity thereof. It is, therefore, necessary to provide a means for absorbing the energy of the weight after the specimen has been broken. For this purpose, small hollow cylinders of lead 42 are placed adjacent the posts 31 and 32 in positions where they will be engaged by the falling weight 12. The lead cylinders 42 are supported on an inertia sandwich 43 resting upon the base 19. This sandwich is formed of a plurality of layers of metal and elastomer with the elastomer being compounded to facilitate absorption of vibrations. As here shown the inertia sandwich comprises an upper metal plate 44 resting upon and bonded to a first layer of rubber 45. The layer of rubber 45 is preferably slotted as indicated at 46 or otherwise provided with openings such that impact upon the plate 44 is absorbed, at least in part, by lateral deformation of the rubber layer 45. A second metal plate 47 is bonded between the rubber layer 45 and a second rubber layer 48. This layer like the layer 45 may be provided with slots or other openings to permit lateral deformation. The construction is such that the hollow cylinders 42 are deformed in partially absorbing the energy of impact. The remaining energy of impact is absorbed, without producing bounce of the weight member, by the inertia sandwich 43, the dimensions and materials of which are selected to provide progressive absorption of the energy. It will be understood that the cylinders 42 are replaced for each use of the apparatus.

Preferably, the indicating device 36 is a two-trace electric oscilloscope with the sweep circuit of one trace connected with the strain gauges, as above described, and the other trace connected with a mechanism for providing an indication of the beginning and/or other reference indicia during the test. This mechanism, in the illustrated embodiment, comprises a source of light 49 which is focused upon a portion of the weight member 12 as the latter moves adjacent to and into engagement of the notches 24 with the rod 40. A photoelectric cell 50 is located in a position for sensing the light reflected from the lamp 49 by the weight 12 and the output of this cell is connected with the oscilloscope 36. The weight member 12 may be provided on the surface adjacent the light source 49 and photocell 50 with one or more areas of different light reflecting nature, for example, parallel bands of white and dark paint or alternating polished and dull finish, to provide in the indication indicia representative of the location of the weight at the time when the specimen is first subjected to stretching by the weight as well as the interval during which the weight passes the location of the photocell. One or more additional pairs of light sources and photocells, 51, 52 respectively, may be located for cooperation with the weight 12 as it stretches the specimen to provide additional reference indicia, each of the photocells, such as 50 and 52, being connected to the same trace of the oscilloscope. By positioning the photocell 50 so that it provides an impulse at the instant when the weight member contacts the rod 40 and the photocell 52, so that it provides an impulse when the weight member has travelled a predetermined distance after contact with the rod 40, a record is provided of the velocity of the weight during the test.

FIG. 4 shows a modification of the specimen supporting means to permit a specimen of ring-shape to be arranged for testing of four legs thereof. In this form of the invention the plate 34, which is provided with the strain gauges, has a specimen supporting member 38' attached thereto which is generally U-shape in configuration with the upper and lower portions bifurcated at right angles to each other. The upper portion of the specimen support 38' is connected with a plate extending downwardly from the strain gauge plate 34 while the lower bifurcation of the support carries a removable, horizontally extending, pin 38a' about which the specimen may be doubled in the manner shown in FIG. 4. The specimen so arranged is then provided with the weight engaged rod 40 which does not require the use of the block 39 to maintain the rod in position for engagement by the weight.

The weight member 12 may be elevated from the bottom of the testing apparatus between the guide members 10 and 11 to its uppermost position where it is held by the releasable mechanism 28 through any suitable apparatus, not shown. This may comprise a windlass or other expedient located in a position such that it does not interfere with free fall of the weight. With the weight at its elevated position and held by the releasing mechanism 28, a specimen S is supported in either the position for a two leg or a four leg test in the manner shown in FIG. 3 or 4, respectively. Power is then supplied to the lamps 49, 51 and to the indicating mechanism 36, and hence to the photocells 50 and 52 and strain gauges A, B, C and D. The test is then initiated by releasing the weight 12. This falls freely and the V-shape notches 24 thereof engage the rod 40, as shown in FIG. 2, rapidly elongating the specimen S and rupturing it. The result of this stretching and rupture of the specimen produces bending of the plate 34 sufficient to provide a response of the strain gauges A, B, C and D which is indicated upon the mechanism 36 and recorded by the camera 37. The weight after rupture of the specimen S strikes the cylinders 42 which together with the inertia sandwich 43 absorb the impact thereby completing the test cycle. The test may be repeated with a new specimen arranged in either the two leg or four leg configuration, as shown in FIG. 3 or 4, by suitable selection of the specimen support.

FIG. 6 is a reproduction of a photograph made with a test apparatus of the type described and employing a two trace oscilloscope. In this figure, the lower curve 53 is that produced by the response of the strain gauges A, B, C and D to elongation and break of the specimen. The impulse from the photocell 50 was employed to trigger the operation of the oscilloscope and to also provide the upper curve 54 in FIG. 6. The sawtooth portion of the curve 54 resulted from light reflection to the photocell 50 from alternate light and dark areas on the weight 12 and affords reference indicia with respect to the beginning of stretch of the specimen which specimen was arranged in the two leg configuration of FIG. 3. The weight was dropped from an elevation of 35 feet and stretch to failure occurred in less than 15 milliseconds. The photocell 52 was not connected during this test.

The apparatus of this invention may be altered in the details of its construction without altering the principles thereof. Thus, the weight releasing mechanism 28 may be so supported that it can be placed at different elevations between the guide members 10 and 11 to thereby provide different velocities of the weight or rates of loading of the specimen. Also, the guide members 10 and 11 need not be cables as shown nor need these be supported in the identical manner illustrated. Furthermore, it is not essential to this invention that the specimens tested be ring-shape in configuration although this is presently preferred. It is, for example, possible, by suitable modification of the specimen support and the means by which the horizontally extending rod 40 is suspended by the specimen, to provide the specimen in a single-leg configuration, as for example in the conventional dumbbell shape which has been widely used in the testing of rubber and other materials.

It is also not essential to the practice of the invention that the means for providing the reference indicia be one or more pairs of photocells and light sources, as shown, nor is the invention limited to the precise arrangement of strain gauges and connections thereof with an oscilloscope as heretofore described and shown in the accompanying drawings. Thus, the force responsive means may be one or more piezoelectric crystals. Moreover, a single trace oscilloscope may be employed as the indicating means with the time sweep thereof utilized to display the desired information on its screen with the sweep calibrated to give elongation directly so long as some means is provided to give an indication of the beginning of stretching of the specimen. This follows from the fact that the weight moves with almost constant velocity during the time of test and hence the specimen is stretched at substantially constant velocity.

The above described and other modifications and variations of the apparatus which will be apparent to those skilled in the art are all considered as falling within the ambit of the invention which is not limited to the specific details as illustrated and described except as required by the spirit and scope of the appended claims.

Having thus described the invention, I claim:

1. Testing apparatus of the type described comprising a weight member, vertically extending guide means for guiding said weight member in free fall under the influence of gravity, means for releasably holding said weight member at a predetermined elevation between said guide means, a specimen support independent of said guide means adjacent the lower ends of the latter and including a portion for suspending a test specimen from the support, means adapted to be suspended from the specimen support by the specimen with the last-named means including oppositely extending cylindrical projections provided with removable deformable sleeves and disposable in the path of said weight member for engagement thereby when the weight member is released and is near the end of its free fall, the said weight member having openings which are substantially inverted V-shape in cross section engageable with the said oppositely extending projections, means responsive to the force exerted upon said specimen support, and indicating means connected to said force responsive means.

2. Testing apparatus of the type described comprising a pair of spaced vertically extending guide cables, a weight member received between said guide cables and provided with surfaces cooperating therewith for guided free fall of the member under the influence of gravity, means to releasably secure said weight member between said guide cables at a predetermined elevation, means independent of said guide cables below and adjacent to the lower ends of the latter to support a test specimen, said support means including a metal plate, electric strain gauge means on said plate responsive to bending thereof, specimen receiving means extending downwardly from said plate for suspending therefrom the specimen to be tested, means adapted to be suspended by the specimen and including portions extending generally horizontally into the path of said weight member for engagement thereby when the latter is released, and indicating means connected to said strain gauge means for providing a visual record of the response of said strain gauge means to deflection of said plate when the said weight member engages said projections, the said indicating means comprising a cathode ray oscilloscope and photocell means with the latter positioned to supply an electrical impulse to said oscilloscope when said weight member engages the said portions suspended by the specimen.

3. Testing apparatus of the type defined in claim 1 wherein said indicating means includes means to provide a record of the response of said force responsive means to elongation of the specimen tested and means to provide on said record indicia representative of the beginning of specimen elongation.

4. Testing apparatus of the type defined in claim 2 and further comprising means to absorb the residual energy of the falling weight, the last-named means including a metal plate positioned to receive the impact of the weight and at least one deformable layer of elastomer between said plate and the base on which the apparatus is mounted.

5. Testing apparatus of the type defined in claim 1 wherein the said force responsive means comprise electric strain gauge means on a portion of said specimen support, the said indicating means comprises a cathode ray oscilloscope connected with said strain gauge means, and means for providing reference indicium including means responsive to the presence of said weight closely adjacent said specimen for supplying an electrical impulse to the oscilloscope.

6. Testing apparatus as defined in claim 2 and further comprising a second photocell means connected to said oscilloscope and positioned to supply thereto an electrical impulse when said weight member has moved a predetermined distance after contacting said portions suspended by the specimen.

References Cited by the Examiner

UNITED STATES PATENTS

| | | | |
|---|---|---|---|
| 1,921,624 | 8/33 | Lewis | 73—12 X |
| 2,323,725 | 7/43 | Nadai et al. | 73—89 |
| 2,362,589 | 11/44 | Simmons | 73—89 |
| 2,475,614 | 7/49 | Hoppmann et al. | 73—12 |
| 2,641,458 | 6/53 | Gilverry et al. | 250—215 |
| 2,660,880 | 12/53 | Vivian | 73—12 |
| 3,082,846 | 3/63 | Jensen et al. | 73—12 X |

RICHARD C. QUEISSER, *Primary Examiner.*

JOSEPH P. STRIZAK, *Examiner.*